March 14, 1939.　　　H. S. EBERHARD　　　2,150,432

TRANSMISSION

Filed Aug. 10, 1937　　　2 Sheets-Sheet 1

INVENTOR
HARMON S. EBERHARD
BY Charles M. Fryer
ATTORNEY

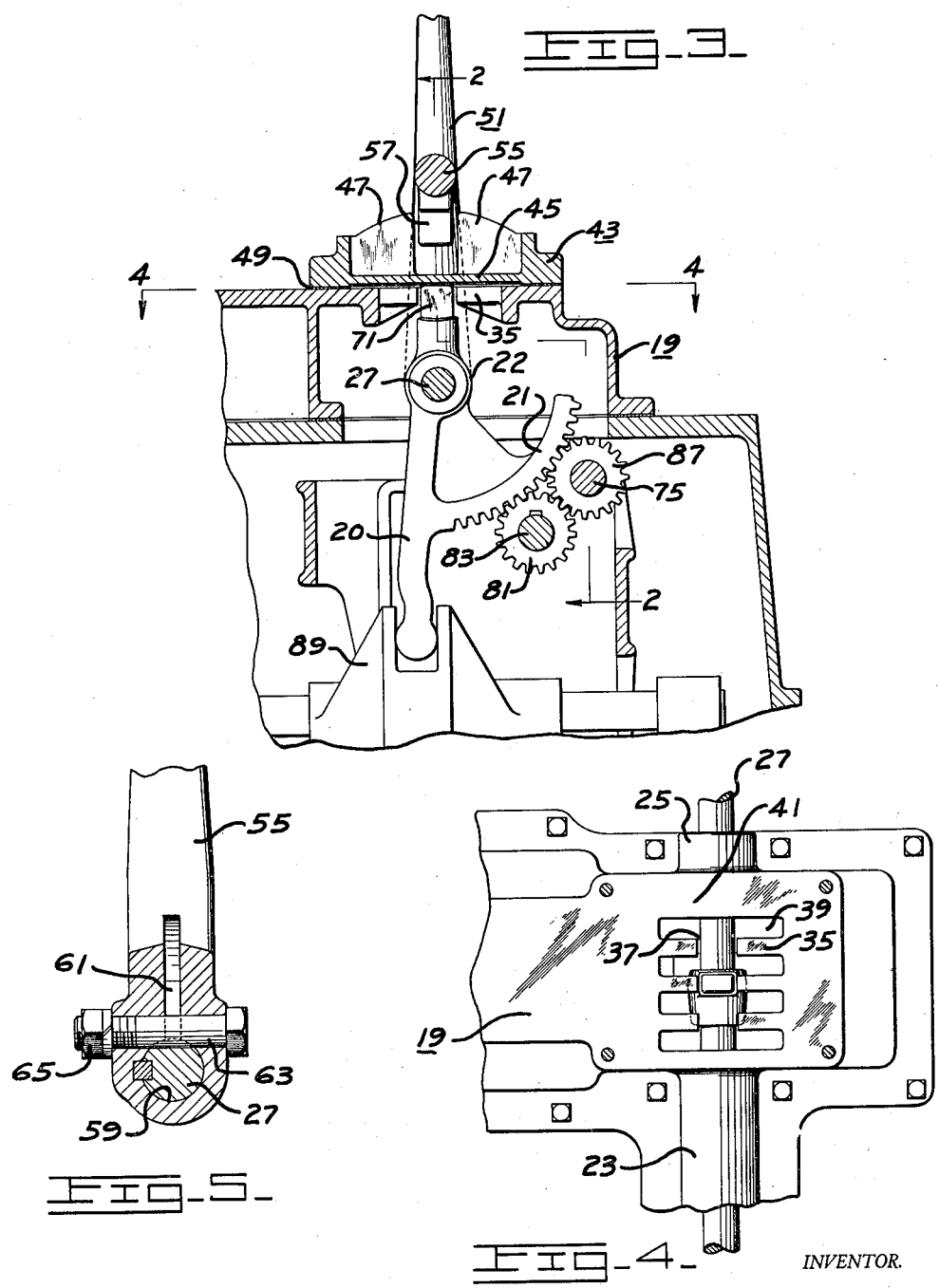

Patented Mar. 14, 1939

2,150,432

UNITED STATES PATENT OFFICE 2,150,432

TRANSMISSION

Harmon S. Eberhard, Peoria, Ill., assignor to Caterpillar Tractor Co., San Leandro, Calif., a corporation of California Application August 10, 1937, Serial No. 158,322

4 Claims. (Cl. 74—473)

My invention relates to speed change transmissions, and more particularly to gear shift control mechanism thereof.

The invention constitutes an improvement on constructions of the type disclosed in the patent to Eberhard No. 2,079,903, which is assigned to the assignee of the present invention. The subject matter of such patent relates to a gear shift mechanism for a multi-speed transmission capable of enabling as much as six changes of speed in the forward direction and two in the reverse. The transmission having such speed change flexibility is particularly adapted for use in automotive vehicles of the tractor type in larger sizes for heavy duty work.

Changing in speed of the drive transmitted by the transmission of the above patent disclosure, is effected by means of an arcuate rack or gear sector and a gear shift collar or fork engaging lever, both integrally formed with and, therefore, under simultaneous control of a gear shift lever extending externally of the transmission housing to within reach of an operator. The gear shift lever is adapted to be laterally shifted to any one of a plurality of positions as a preliminary step in setting up a desired combination of gears, and then by rocking the gear shift lever in either the forward or rearward direction, the gears are maneuvered into position to effect the desired speed relationship.

During the lateral shifting of the gear shift lever, the gear sector is adapted to engage any one of a plurality of pinions constituting a forward and reversing drive means to effect rotational movement of a cam which in turn determines the movement of a gear shift fork engaging lever in either a forward or reverse direction in accordance with the direction of rotation of the cam. These pinions are three in number and comprise a central pinion mounted on a shaft and maintained constantly in mesh with the remaining two pinions, which are laterally spaced to either side of the first pinion and keyed to a separate shaft. In order to maintain these pinions in constant meshing engagement, the centrally located pinion is of a length sufficient to overlap and engage the pinions on the other shaft. This arrangement, therefore, provides means for rotating the cam in question in either a clockwise or counterclockwise direction for the same direction of angular movement of the gear shift lever.

The first mentioned gear shift fork engaging lever, which was described as being integrally formed with the gear shift lever, is adapted upon lateral displacement to engage either one of two gear shift forks, thereby enabling an operator to arrange, in cooperation with the cam operated gear shift fork engaging lever, for a variety of combinations of gears to effect the speed changes for which the transmission is designed, merely by rocking the gear shift lever either forwardly or rearwardly after having first established the proper lateral displacement of the gear shift lever.

Lateral displacement of both the gear sector and the aforementioned integrally formed gear shift fork engaging lever is permitted in the construction of the patent, by securing the integrally formed gear shift lever controlled gear sector and fork engaging lever on a shaft, for example, by means of a pin therethrough, which shaft is in turn slidably mounted in suitable guideways provided within the housing.

By reason of the many speed changes of which the transmission is capable of providing, this necessitates a plurality of different lateral shifting positions of the gear shift lever, as distinguished from transmissions capable of only a few speed changes, wherein a lateral shift of the gear shift lever to either one of two positions is sufficient to permit the necessary maneuvering of the gear shift lever, as in the customary gear shift control for automobiles.

The transmission disclosed in the Eberhard patent which is capable of six forward speeds and two reverse, thus requires four different lateral shift positions of the control lever in order to shift the transmission through the complete range of speeds of which it is capable. It has accordingly become necessary, therefore, to provide some sort of a guiding means for the operator, to enable him to accurately determine the necessary lateral movement of the gear shift lever to effect the proper gear combination for a desired speed.

In accordance with the disclosure of the aforementioned patent, the transmission housing is formed with an opening through which the gear shift lever extends, and over this opening is placed a selector plate formed with a plurality of opposed ribs extending inwardly from opposite side walls of the selector plate to provide a main lateral slot and a plurality of branch slots extending to either side of the main slot and normal thereto. By reason of the fact that the gear shift lever, according to the construction disclosed, extends into the transmission housing at this point, the selector plate of the patent must be open at the bottom to permit of the necessary manipulation of this lever.

This construction exposes the transmission to the entrance of dust, and in order to provide some sort of a protection against dust entering the transmission housing, it is necessary to establish a seal below the selector plate for this purpose. This requires a rather complicated casting for the top portion of the housing, as will be apparent from the drawings of the patent, in order to provide suitable packing supports for the seal, which is of itself necessarily complex, because it not only has to permit of the lateral shifting of the gear shift lever, but also enable the gear shift lever to be oscillated or rotated into the proper branch slot without impairing its sealing ability and thereby exposing the elements beneath. The comparatively large open space existing through the selector plate, permits continual entrance of dust therethrough, and thus to adequately protect the transmission against the entrance of such dust, necessitates a very effective seal and one which is more or less costly.

A poor seal or one which is defective might result in serious injury to the transmission, due to allowing such dust to filter through in among the moving elements in the transmission housing. The effects would ultimately manifest themselves in excessive wearing of these elements, whereby the mechanism would be thrown out of adjustment and difficulty would be experienced in obtaining accurate timing or meshing of the gears.

It is accordingly an object of my invention to provide an improved gear shift mechanism which shall:

(1) be sealed against the entrance of dust or other deleterious matter;
(2) maintain its initial accurate adjustment;
(3) assure accurate timing or meshing of the gears at all times;
(4) reduce wear on component parts and thereby increase its life and usefulness;
(5) simplify its construction and manufacture.

Not only does my invention contemplate the above listed objects, but has for additional objects, to provide an improved shifting mechanism which shall afford easier and quicker shifting, and which shall reduce the extent of throw or shift of the lateral gear shift lever over what has been formerly necessary with constructions such as disclosed in the Eberhard patent. A description of my invention follows in connection with the accompanying drawings, wherein:

Fig. 3 is a view partly in section taken along the lines 3—3 of Fig. 2.

Fig. 4 is a plan view taken along the line 4—4 of Fig. 3.

Fig. 5 is a view partly in section taken along the line 5—5 of Fig. 2.

In general, I have accomplished the principal objects of my invention by providing a transmission housing sealed to the entrance of dust and extending the slidable gear shift controlled shaft through the walls of the housing, and supporting it therein by means of sealed bearings; and otherwise modifying in a novel manner the gear shift lever and the elements associated with the slidable shaft to accommodate themselves to the changes already mentioned. Thus movement of the gear shift lever externally of the transmission housing is transmitted to the elements within the housing through dust sealed bearings and the problem of assuring protection of the transmission against the ravages of dust is thereby removed.

I am also enabled through a slight modification of the gear sector engaging pinions, to reduce the throw of the gear shift lever in effecting a change from one speed to another, and this in a few words, I accomplish by reconstructing the aforementioned middle pinion to constitute a middle section of a length insufficient to effect engagement with the other pinions at any time, and end sections spaced from the middle section and adapted to maintain an effective engagement with the others. Through this change in the pinion construction, the gear sector will disengage itself from the middle section of the pinion and engage one of the other pinions sooner than was previously possible under the prior construction of Eberhard, wherein these pinions were maintained in overlapping engagement at all times. Consequently, since this involves a shorter lateral displacement of the slidable shaft, it necessarily reduces the extent to which the gear shift lever must be displaced laterally in making this shift.

Figure 1:
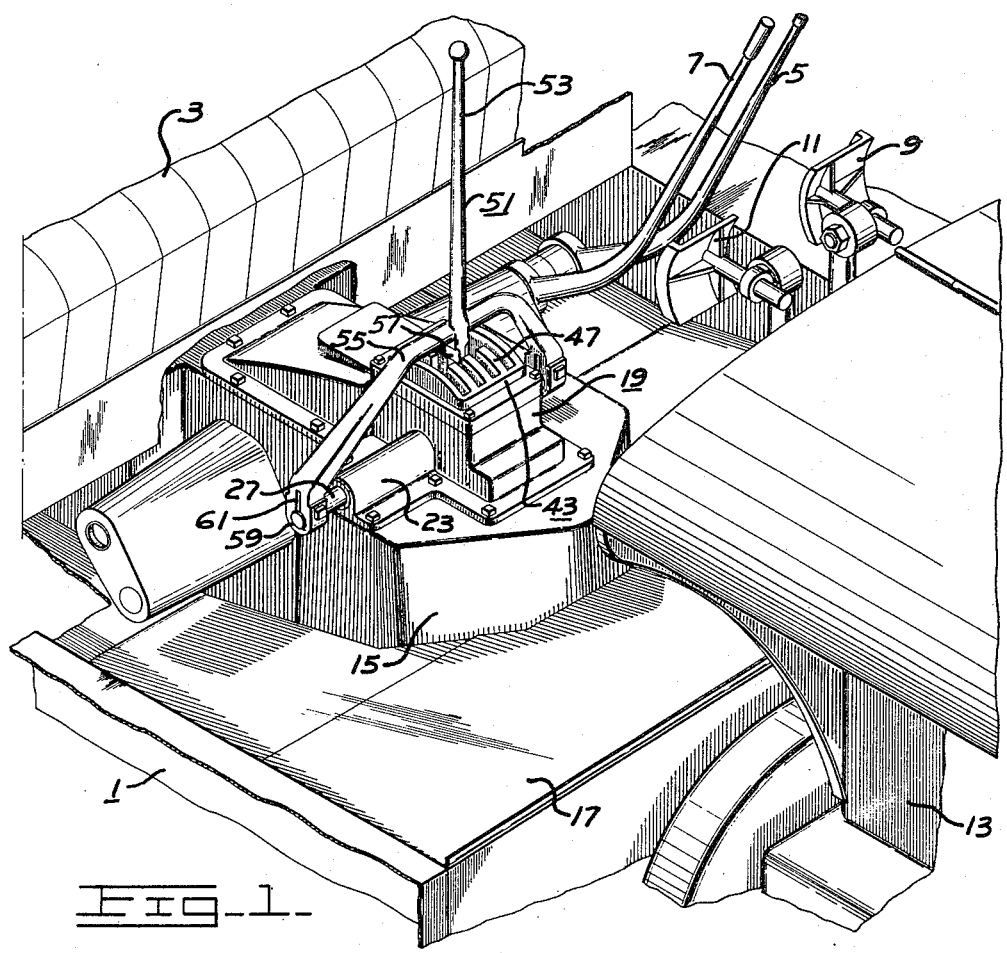
Fig. 1 is a perspective, illustrating an external view of my invention as applied to a tractor.
Figure 2:
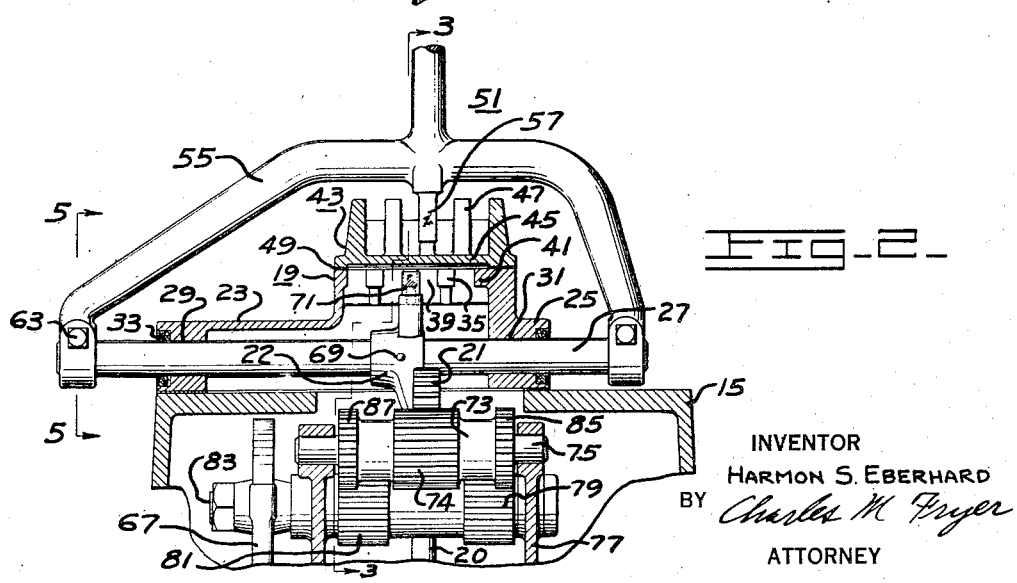
Fig. 2 is a view of my improved gear shift mechanism partly in section, taken along the lines 2—2 of Fig. 3.

In Fig. 1 of my drawings, I have disclosed my invention as applied to a tractor 1; and its association with the operator's seat 3, the steering clutch levers 5 and 7, the brake levers 9 and 11, and the power plant 13 is clearly brought out in this view.

The transmission in its customary position is located between the driver's seat 1 and the power plant 13, the housing 15 enclosing the transmission, extending above the floor board 17, and is provided with a guard cover 19 suitably shaped to provide for mounting of the preferably integrally formed gear shift fork engaging lever 20 and arcuate rack or gear sector 21 therein, and permit of its lateral as well as its angular rotational movement. This cover, which constitutes part of the housing, has bearing supporting extensions 23 and 25 terminating in bearings 29 and 31 which support an axially slidable or shiftable shaft 27 extending through the housing and journalled for rotation in the bearings, the bearings being sealed against the entrance of dust, with seals of any satisfactory type, of which there are many known in the prior art. I have shown such a seal in a simplified form as constituting a sealing means 33 embedded in an enlarged groove in the bearing and surrounding the shaft 27.

The guard cover 19 may be cast or otherwise formed with an opening in the top, so shaped as to define ribs 35 extending inwardly from opposite walls of the opening to provide a central transverse slot 37 and a plurality of shorter slots 39 extending normal to the main transverse slot. This top portion of the guard cover may be considered as a selector plate 41 integrally formed with the cover.

The opening through the top of the cover is effectively sealed by another but separately formed selector plate 43, having a bottom wall 45 to completely close the opening in the guard cover, the selector plate being formed with ribs 47 similar to those of the integrally formed selector plate, to provide substantially the same arrangement of slots as previously described. Suitable gasket means 49 may be inserted between the separately formed selector plate 43 and the guard cover 19, previous to bolting the separately formed selector plate to the cover, to better effect a dust tight seal along the joint thus formed.

The gear shift lever 51 is formed in a novel manner to accommodate itself to the construction changes described, and as constructed, comprises a handle or grip portion 53 terminating in a yoke 55 which is adapted to span the selector plate 43 and cover 19 and engage the shiftable shaft 27 at its extremities, the shaft extending sufficiently beyond the bearings to provide latitude for shifting of the shaft, such distance as may be necessary to obtain the proper selection of gears within the transmission housing.

A depending finger 57 attached to the lower extremity of the gear shift handle portion, at the point where it joins with the yoke 55, is adapted to engage slots in the selector plate 43 to thereby enable an operator to determine the proper position of the gear shift mechanism for obtaining any desired arrangement of gears to effect a predetermined speed.

The yoke 55 is affixed to the extremities of the slidable shaft 27 in a manner which precludes relative displacement of the yoke with respect to the shaft, and assures a solid connection at these points. The extremities of the yoke are each provided with an opening 59 of a diameter sufficient to receive the shaft in question, and a slot 61 coextensive with the opening to permit the end of the yoke to be drawn together in binding engagement against the shaft, by means of a bolt 63 passing through the slotted portion and tightened by means of a nut 65. The yoke and the shaft are keyed to prevent rotational movement of one with respect to the other, and lateral displacement of one with respect to the other is avoided by locating the tightening bolt 63 so as to make it necessary to groove the shaft 27 in order to permit the bolt to pass through the end of the yoke.

The gear sector 21, which controls the direction of rotation of the cam operated gear shift fork engaging lever 67 is fixedly carried on shaft 27 by a pin 69 extending through the hub of the gear sector and the shaft. In assembling the shaft and gear sector, the shaft may be inserted endwise through one of the bearings 29, through the gear sector held in position in the cover 19, and then through the other bearing 31. The pin 69 may be then inserted through the shaft and the gear sector. An upstanding finger 71, formed integral with the gear sector, is adapted to engage the slots 39 in selector plate 41, the location of the finger being such that it will engage a slot corresponding to that slot which the depending finger 57 on the gear shift handle happens to be in engagement with. Such arrangement cooperates with selector plate 43 and the finger 57 on the gear shift lever to provide stability and maintain proper timing of the gear shift mechanism. The gear sector is adapted to selectively engage either a gear 73 mounted on a shaft 75 supported on a suitable bracket 77 within the transmission housing or either one of a pair of pinions 79 and 81 keyed to a shaft 83 mounted on the same bracket. Selective engagement of the above mentioned pinions is realized by a lateral shifting of the gear sector 21.

The gear of pinion 73, in accordance with my improved construction, is provided with a midsection 74 of a shorter length than that disclosed in the Eberhard patent referred to above, its length being such as to avoid any overlapping between this portion of the gear and the other pinions 79 and 81. An effective meshing of the pinion 73 with the pinions 79 and 81, however, is provided for by means of a pair of end portions 85 and 87 integrally constructed with the midportion 74 of the pinion 73, but laterally displaced therefrom, and these end portions are maintained in constant meshing engagement with the pinions 79 and 81, respectively, thereby producing the same effect as would be obtained through a direct meshing of the section 74 with these other pinions. Through my improved arrangement, however, a decided advantage has been realized, in that the lateral displacement of the gear sector 21 to effect engagement with either of the pinions 79 and 81, and disengagement with the pinion 73 is substantially less than was formerly necessary with the arrangement such as illustrated by Eberhard in his patent.

The gears which constitute the transmission may be similar to the arrangement of gears illustrated and described in detail in the Eberhard patent, referred to above, in which case the lever 20 will engage a shifting fork 89 or a similar fork (not shown) laterally displaced therefrom in the line of lateral shift of the gear shift lever, and the cam operated lever 67 will be maintained in meshing engagement with a shifting fork, not shown.

It will be apparent from the above description of my invention, that I have fulfilled all the objects for which my invention has been created. This construction which I have described provides a housing 15 sealed to the entrance of dust, yet enabling an operator to control the speed of operation through the shifting of gears in a similar manner as heretofore; more efficiently, however, and with every assurance that the mechanism will maintain its original adjustment due to the impossibility of excessive wear and the resulting looseness and play which such wear would occasion, practically entirely traceable to entrance of dust between the elements making up the shifting mechanism in my improved construction.

Since the gear sector 21 is fixedly mounted on shaft 27 free of any connection directly with gear shift lever 51, there is little likelihood of such sector loosening up on the shaft 27, by reason of the fact that the shifting forces applied to the gear shift lever 51 are not transmitted to the slidable shaft through the gear sector connection thereto, as has heretofore been the case. Such forces are now transmitted through the rugged yoke construction 55 directly to the shaft and independently of the gear sector connection thereto.

The wide spacing of the bearings 29 and 31 for supporting the shiftable shaft 27, and the yoke construction of the gear shift control lever, permit shifting with less effort than was formerly possible with the old construction.

The construction of the guard cover 19 for the housing 15 is considerably less complex in design, and enables this portion of the housing to be cast with a comparatively simple mold. Furthermore the present arrangement obviates any possibility of deleterious or foreign matter entering the sealed transmission housing, and thereby removes the sealing problem. Just a simple flat plate 43, which I have disclosed as having ribs formed thereon to constitute a selector plate, now takes the place of and performs extremely more efficiently to seal the housing at this point than the complicated sealing means previously referred to. This simplified construction is made possible by the fact that due to applicant's improved gear shift mechanism, this seal does not seal between relatively movable parts and may therefore be immovably fixed in position.

While I have disclosed my invention in great detail, it is subject to many changes and modifications without departing from the spirit thereof. For example, I may do away with the integrally formed selector plate 41 and the gear sector engaging finger 71, and rely solely upon the independently formed selector plate 43, which serves to cover up the opening in the cover, for setting up the various gear combinations. In my preferred embodiment, however, I prefer to maintain both selector plates, relying upon the gear sector finger 71 and the integrally formed selector plate 41 for accurately setting up the gear combinations, in which case the gear selector plate 43 with which the gear shift lever 51 engages, will be more in the nature of an indicator to the operator, to assist him in guiding the gear sector finger 71 in its proper slot. With the preferred form, there is essentially no way whereby the gear sector might become out of adjustment with respect to the selector plate, because of the direct association therewith.

The construction might be modified somewhat by integrally forming the two selector plates as a unit and employing it as a cover plate in the same manner as the selector plate 43, to seal the opening in the guard cover 19.

My invention, furthermore, while disclosed in connection with multi-speed change transmissions requiring selector plates etc., embodies a construction which broadly permits gear shift control through a dust sealed housing regardless of the presence or reliance upon selector plates, and therefore is not limited to any specific type of transmission or gear shift mechanism. It is clear that my improved gear shift construction will serve to advantage in connection with transmissions having fewer speed changes and requiring no selector plates for guiding an operator.

Of particular significance is the fact that when employed on an automotive vehicle, such as a tractor, my invention removes a problem, the solution of which is considerably more difficult because of the necessity for the gear shift lever to extend upwardly above a wall of the transmission housing and within reach of an operator. This accounted for the fact that in previous automotive installations, the gear shift lever extended through an opening in the upper wall of the transmission housing, in spite of the dust problem which this construction developed. By my improved construction the dust problem has been removed by permitting the complete sealing of the entire upper wall of the housing with an immovable seal, and yet maintaining the position of the gear shift lever in its original location over the wall of the housing and without in any way altering its freedom of lateral and oscillatory movement except to improve upon the same.

I, therefore, do not desire to be limited in my protection to the details of my disclosure except as may be necessitated by the prior art and the appended claims.

I, therefore, claim as my invention:

1. Mechanism comprising a transmission housing having an opening therein, a selector plate mounted on said housing over said opening having its selector means positioned directly over said opening and sealing said housing to the entrance of dust through said opening, a transmission enclosed therein comprising a plurality of gears and including a shiftable shaft extending through said housing and slidably supported in opposite spaced walls of said housing by sealed bearings, gear shift control means external of said housing having an operating handle extending from directly over said housing and engaging said selector plate, said control means also having forked means mechanically connected to said shiftable shaft to transmit movement of said gear shift control means to said transmission gearing within said housing.

2. In a vehicle, a transmission housing, shiftable gearing in said housing, control means for said shiftable gearing also mounted in said housing and including a slidable shaft within said housing having its ends extending outwardly of said housing for enabling said control means to function in controlling the shifting of said shiftable gearing, and a gear shift lever terminating in a yoke having its ends secured to the outwardly extending ends of said shaft, said gear shift lever extending above said housing to within reach of an operator.

3. In combination, a transmission housing having controllable mechanism therein, control gearing therefor comprising a gear sector, a plurality of pinion members distributed on separate shafts, positioned to be selectively engaged by said gear sector, one of said pinion members being provided with end pinion portions spaced from an intermediate pinion portion for maintaining said pinion member in constant meshing engagement with spaced pinion portions on a second of said pinion members, a slidable shaft within said housing for supporting said gear sector and permit of its being shifted into selectable engagement with said aforementioned pinion members, said slidable shaft extending through the walls of said housing, and a gear shift lever mechanically connected to at least one end of said shaft.

4. Gear shift mechanism comprising a gear sector slidably and rotatively supported, a plurality of pinion members selectively engageable by said gear sector and supported on separate shafts, and means for maintaining said pinion members in constant engagement comprising an end pinion portion on one of said pinion members spaced from another pinion portion on said one pinion member, said end pinion portion meshing with a pinion portion on a second of said pinion members.

HARMON S. EBERHARD.